United States Patent
Stuart et al.

(10) Patent No.: US 6,655,004 B2
(45) Date of Patent: Dec. 2, 2003

(54) METHOD OF MAKING A POWDER METAL ROTOR FOR A SURFACE

(75) Inventors: Tom L. Stuart, Pendleton, IN (US); Frederick B. Reiter, Jr., Cicero, IN (US)

(73) Assignee: Delphi Technologies, Inc., Troy, MI (US)

( * ) Notice: Subject to any disclaimer, the term of this patent is extended or adjusted under 35 U.S.C. 154(b) by 78 days.

(21) Appl. No.: 09/970,223

(22) Filed: Oct. 3, 2001

(65) Prior Publication Data

US 2003/0062789 A1 Apr. 3, 2003

(51) Int. Cl.[7] .............................................. H02K 15/16
(52) U.S. Cl. .............................. 29/596; 29/598; 29/607; 29/608
(58) Field of Search .................... 419/6, 66; 428/78; 310/156.38, 156.43, 156.45, 156.44, 156.48, 156.53, 156.56; 427/180, 226, 383.1, 127, 131; 29/596, 598, 607, 608; 148/513, 514

(56) References Cited

U.S. PATENT DOCUMENTS

| | | | |
|---|---|---|---|
| 3,670,189 A | * 6/1972 | Monroe | 310/46 |
| 3,780,418 A | 12/1973 | Hurst | 29/420 |
| 3,864,154 A | 2/1975 | Gazza et al. | 29/123 B |
| 4,419,413 A | 12/1983 | Ebihara | 428/548 |
| 4,602,956 A | 7/1986 | Partlow et al. | 75/235 |
| 4,713,215 A | 12/1987 | Madsac | 419/8 |
| 5,010,266 A | 4/1991 | Uchida | 310/156 |
| 5,043,123 A | 8/1991 | Gormanns et al. | 264/113 |
| 5,069,866 A | 12/1991 | Ekbom | 419/6 |
| 5,091,022 A | 2/1992 | Achikita et al. | 148/104 |
| 5,191,256 A | 3/1993 | Reiter, Jr. et al. | 310/156 |
| 5,371,426 A | 12/1994 | Nagate et al. | 310/156 |
| 5,576,075 A | * 11/1996 | Kawasaki et al. | 427/565 |
| 5,666,632 A | 9/1997 | Maulik | 419/6 |
| 5,684,352 A | 11/1997 | Mita et al. | 310/156 |
| 5,701,943 A | 12/1997 | Young | 164/97 |
| 5,722,032 A | * 2/1998 | Gay | 419/6 |
| 5,801,470 A | 9/1998 | Johnson et al. | 310/156 |
| 5,820,963 A | * 10/1998 | Lu et al. | 428/65.3 |
| 5,841,212 A | * 11/1998 | Mita et al. | 310/156.56 |
| 5,935,722 A | 8/1999 | Moorhead et al. | 428/694 B |
| 5,993,733 A | 11/1999 | Kawai | 419/48 |
| 6,203,752 B1 | 3/2001 | Bewlay et al. | 419/6 |
| 6,208,054 B1 | 3/2001 | Tajima et al. | 310/156 |
| 6,287,513 B1 | 9/2001 | Grady et al. | 419/37 |
| 6,331,214 B1 | 12/2001 | Koga et al. | 148/101 |
| 6,392,324 B1 | 5/2002 | Kuwahara | 310/156.11 |

FOREIGN PATENT DOCUMENTS

JP        8-340666        12/1996 .......... H02K/19/14

* cited by examiner

*Primary Examiner*—A. Dexter Tugbang
*Assistant Examiner*—Tai V Nguyen
(74) *Attorney, Agent, or Firm*—Jimmy L. Funke

(57) ABSTRACT

A method of making a composite powder metal disk for a rotor assembly in a surface permanent magnet machine. The method includes filling inner and outer annular regions of a disk-shaped die with soft and hard ferromagnetic powder metals, compacting the powders, and sintering the compacted powders. By this method, a disk is formed that includes permanent magnets on the surface of an inner ring of magnetically conducting powder metal compacted and sintered to a high density. In one embodiment, non-ferromagnetic powder metal is filled into regions of the die such that the permanent magnets are separated by magnetically non-conducting powder metal compacted and sintered to a high density. The method may also include forming a rotor assembly by stacking a plurality of the composite powder metal disks axially along a shaft with their magnetic configurations aligned.

45 Claims, 7 Drawing Sheets

METHOD OF MAKING A POWDER METAL ROTOR FOR A SURFACE

FIELD OF THE INVENTION

This invention relates generally to permanent magnet machines, and more particularly, to the manufacture of surface permanent magnet rotors for a permanent magnet machine.

BACKGROUND OF THE INVENTION

It is to be understood that the present invention relates to generators as well as to motors, however, to simplify the description that follows, a motor will be described with the understanding that the invention also relates to generators. With this understanding, rotors including permanent magnets previously utilized curved magnets adhesively fixed to the periphery of the rotor or permanent magnets embedded in a steel rotor core.

Adhesive bond lines between laminations and between permanent magnets and the rotor cores are subject to failure during operation. Moreover, motor or generator heating and environmental conditions degrade the integrity of the adhesive, potentially leading to eventual magnet separation and rotor failure.

To help retain surface or adhesive mounted permanent magnets, a thin retaining cylinder, usually of metallic or wound fibrous construction, is employed. The use of such a thin retaining cylinder does have detrimental effects on machine performance and efficiency. In addition, the required cylinder thickness for a larger high speed motor or generator can make the use of such a can for these applications impractical.

Permanent magnets embedded in the steel core are retained by thin webs stamped into the lamination material. Determining the width of the thin webs involves a trade-off concerning flux leakage versus structural integrity. Making the web wider allows for higher speed operation and greater rotor robustness at the expense of greater flux leakage, more magnet cost, and lower machine output and efficiency.

There is thus a need to develop a permanent magnet machine that is not subject to magnet separation and adhesive or web failure, but rather has high mechanical integrity, and preferably that may be produced at a lower cost than that of current permanent magnet motors.

SUMMARY OF THE INVENTION

The present invention provides a composite powder metal disk for a rotor assembly in a permanent magnet machine, the disk having an inner annular magnetically conducting segment of soft ferromagnetic powder metal compacted and sintered to a high density. The disk further comprises an outer annular permanent magnet segment of alternating polarity permanent magnets. The permanent magnet segment may be a continuous magnet ring with regions of alternating polarity around the circumference of the disk or may be discrete permanent magnets separated from each other by spaces or by non-ferromagnetic powder metal segments pressed and sintered to a high density. In a further embodiment, a rotor assembly is provided having a plurality of the composite powder metal disks axially stacked along and mounted to a shaft. There is further provided a method of making such a composite powder metal disk and rotor assembly in which a die is filled according to the desired surface permanent magnet pattern, followed by pressing the powder metal and sintering the compacted powder to achieve a high density composite powder metal disk of high structural stability. The permanent magnets may be hard ferromagnetic powder metal pressed and sintered with the soft ferromagnetic and optional non-ferromagnetic powder metal, or may be prefabricated magnets adhesively affixed in the disks after sintering the powder metal portions. These disks are then stacked axially along a shaft with their magnetic patterns aligned to form the powder metal rotor assembly. A permanent magnet machine incorporating the powder metal rotor assembly of the present invention is simpler to manufacture and at a lower cost than prior surface permanent magnet rotors.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
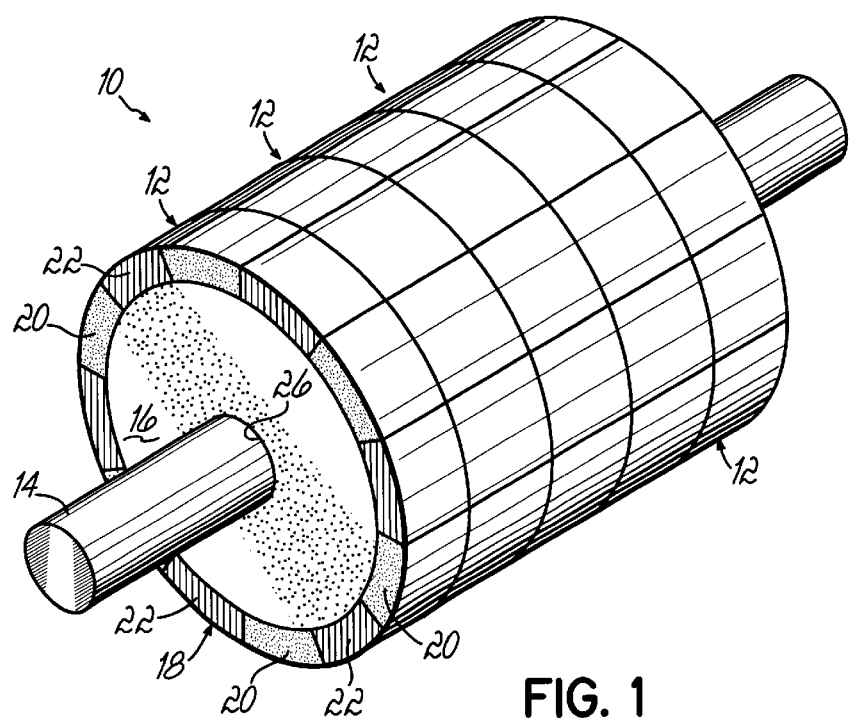
FIG. 1 is a perspective view of a powder metal rotor assembly of the present invention having a plurality of disks stacked along a shaft, each having surface permanent magnets spaced around a powder metal magnetically conducting segment.

The present invention provides composite powder metal rotor components for rotor assemblies in surface permanent magnet machines. Permanent magnet machines incorporating the composite powder metal components exhibit high power density and efficiency and high speed rotating capability. To this end, and in accordance with the present invention, a plurality of powder metal disks or laminations are fabricated to comprise an inner annular magnetically conducting segment and an outer annual permanent magnet segment or ring.

The magnetically conducting segment comprises a pressed and sintered soft ferromagnetic powder metal. In an embodiment of the present invention, the soft ferromagnetic powder metal is nickel, iron, cobalt or an alloy thereof. In another embodiment of the present invention, this soft ferromagnetic metal is a low carbon steel or a high purity iron powder with a minor addition of phosphorus, such as covered by MPIF (Metal Powder Industry Federation) Standard 35 F-0000, which contains approximately 0.27% phosphorus. In general, AISI 400 series stainless steels are magnetically conducting, and may be used in the present invention.

The permanent magnet segment or ring comprises a series of alternating polarity permanent magnets, such as ferrite or rare earth permanent magnets. Depending on the particular machine, it is within the skill of one in the art to determine the appropriate number and size of permanent magnets to be spaced around the exterior circumferential surface of the disk.

In one embodiment, the permanent magnet segment is a continuous magnet ring of pressed and sintered hard ferromagnetic powder metal, which is subsequently magnetized to create regions of alternating polarity around the entire surface. Alternatively, the permanent magnet segment is a plurality of discrete permanent magnets spaced apart by air gaps that extend from the inner annular magnetically conducting segment to the edge of the disk. The discrete permanent magnets comprise pressed and sintered hard ferromagnetic powder metal. In yet another alternative, the permanent magnet segment is a plurality of discrete permanent magnets spaced apart by magnetically non-conducting segments comprising pressed and sintered non-ferromagnetic powder metal. In this embodiment, the permanent magnets may be either prefabricated magnets affixed to the inner annular segment and the magnetically non-conducting segments, or pressed and sintered hard ferromagnetic powder metal.

In an embodiment of the present invention, the non-ferromagnetic powder metal is austenitic stainless steel, such as SS316. In general, the AISI 300 series stainless steels are non-magnetic and may be used in the present invention. Also, the AISI 8000 series steels are non-magnetic and may be used.

In an embodiment of the present invention, the soft ferromagnetic metal of the inner annular magnetically conducting segment and the non-ferromagnetic metal in the outer annular permanent magnet segment are chosen so as to have similar densities and sintering temperatures, and are approximately of the same strength, such that upon compaction and sintering, the materials behave in a similar fashion. In an embodiment of the present invention, the soft ferromagnetic powder metal is Fe-0.27%P and the non-ferromagnetic powder metal is SS316.

The inner annular magnetically conducting segment may optionally further comprise a magnetically non-conducting insert positioned to surround a shaft in the rotor assembly. This insert comprises non-ferromagnetic powder metal as described above in the permanent magnet segment. The insert functions to insulate the hub and shaft from magnetic flux. The insert may further have a star-shaped configuration designed to enhance the flux between the magnets, as will be shown and described further below.

The powder metal disks of the present invention typically exhibit a magnetically conducting segment having at least about 95% of theoretical density, and typically between about 95%–98% of theoretical density. Wrought steel or iron has a theoretical density of about 7.85 gms/cm$^3$, and thus, the magnetically conducting segment exhibits a density of around 7.46–7.69 gms/cm$^3$. The non-conducting segments of the powder metal disks of certain embodiments of the present invention exhibit a density of at least about 85% of theoretical density, which is on the order of about 6.7 gms/cm$^3$. Thus, the non-ferromagnetic powder metals are less compactible then the ferromagnetic powder metals. The pressed and sintered hard ferromagnetic powder metal magnets of certain embodiments of the present invention exhibit a density of at least about 95.5%±3.5% of theoretical density, depending on fill factor, which is on the order of about 3.8–7.0 gms/cm$^3$.

The powder metal disks or rings can essentially be of any thickness. These disks are aligned axially along a shaft and mounted to the shaft to form a rotor assembly. The shaft is typically equipped with a key and the individual disks have a keyway on an interior surface to align the disks to the shaft upon pressing the part to the shaft. In an embodiment of the present invention, the individual disks or rings have a thickness on the order of about ⅜ to ⅞ inches. As disk thicknesses increase, the boundaries between the powder metal conducting segment, the powder metal nonconducting segments or inserts, and the powder metal permanent magnets may begin to blur. In practice, up to 13 disks of the present invention having a ⅜–⅞ inch thickness are suitable for forming a rotor assembly. There is, however, no limit to the thickness of each disk or the number of disks that may be utilized to construct a rotor assembly. The individual disks are aligned with respect to each other along the shaft such that the magnetic flux paths are aligned along the shaft. The non-ferromagnetic powder metal acts as an insulator between the aligned flux paths comprised of the soft ferromagnetic powder metal segment and the permanent magnets, and increases the structural stability of the assembly. This arrangement allows better direction of magnetic flux and improves the torque of the rotor assembly.

Figure 2:
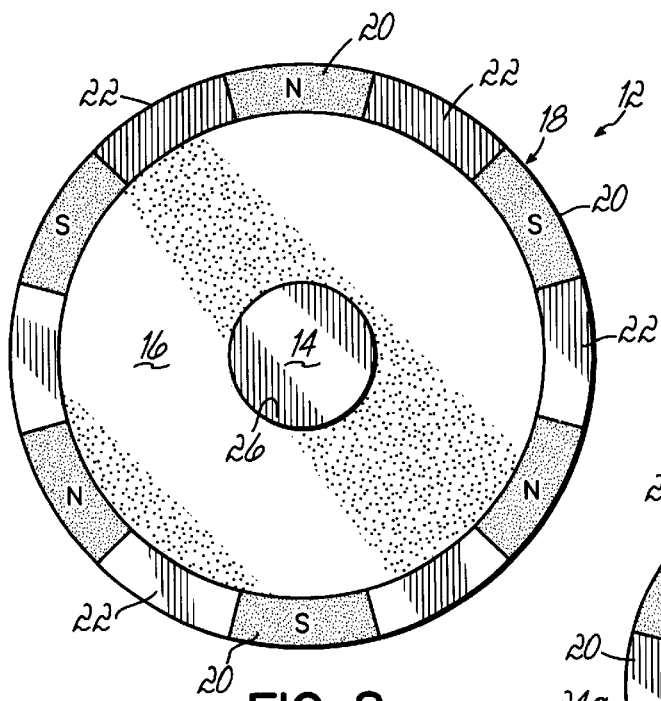
FIG. 2 is a plan view of the rotor assembly of FIG. 1.

With reference to the Figures in which like numerals are used throughout to represent like parts, FIGS. 1 and 2 depict in perspective view and plan view, respectively, a powder metal rotor assembly 10 of the present invention having a plurality of powder metal composite disks 12 stacked along a shaft 14, each disk 12 having an inner annular magnetically conducting segment 16 and an outer annular permanent magnet segment 18 comprising a plurality of alternating polarity permanent magnets 20. The disks are aligned from one disk 12 to another along the length of the shaft 14. In the particular embodiment of FIGS. 1 and 2, the permanent magnet segment 18 includes magnetically non-conducting segments 22 separating the permanent magnets 20. The non-conducting segments 22 provide insulation that directs the magnetic flux from one permanent magnet 20 to the next alternating polarity permanent magnet 20. Further in this embodiment, the permanent magnets may be comprised of powder metal pressed sequentially or concurrently with the powder metals used to form the inner annular magnetically conducting segment 16 and the nonconducting segments 22. Alternatively, the permanent magnets may be prefabricated and inserted into spaces between the non-conducting segments 22. The prefabricated magnets may be adhesively affixed within the spaces, and this structure has improved structural stability as a result of the adjacent non-conducting segments. A retaining cylinder could also be used.

Figure 3:
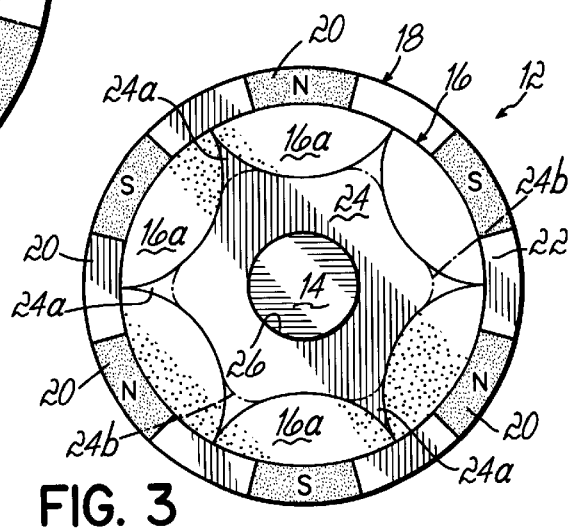
FIGS. 3–6 are plan views of alternative embodiments of powder metal rotor assemblies of the present invention having surface permanent magnets.

FIG. 3 depicts a disk similar in configuration to that depicted in FIGS. 1 and 2, but includes a magnetically non-conducting insert 24 in the inner annular segment 16. Insert 24 has an essentially star-shaped configuration and extends from the interior surface 26 of the disk 12 into tip portions 24a or 24b that terminate at (24a) or near (24b) a respective permanent magnet 20 in the outer annular permanent magnet segment 18. As can be seen, the magnetically conducting portion 16a of the inner annular magnetically conducting segment 16 directs magnetic flux from one permanent magnet 20 to the next alternating polarity permanent magnet 20. The insert 24 further blocks magnetic flux from being channeled toward the shaft 14.

Figure 4:
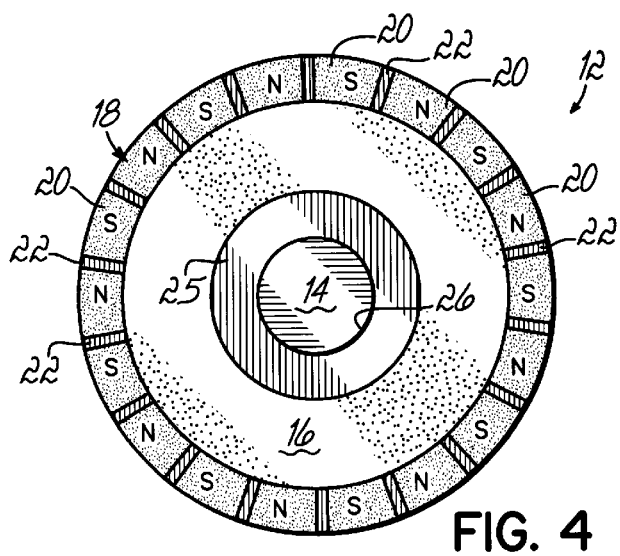

In FIG. 4, the composite powder metal disk 12 is similar to that depicted in FIGS. 1 and 2, but the disk 12 further includes an inner annular non-conducting segment 25 adjacent the interior surface 26 of the disk 12. As with the insert 24 of FIG. 3, insert 25 blocks magnetic flux from being channeled into the shaft 14. FIG. 4 also depicts a higher number of smaller permanent magnets 20 separated by thinner non-conducting segments 22 as compared to FIGS. 1 and 2.

Figure 5:
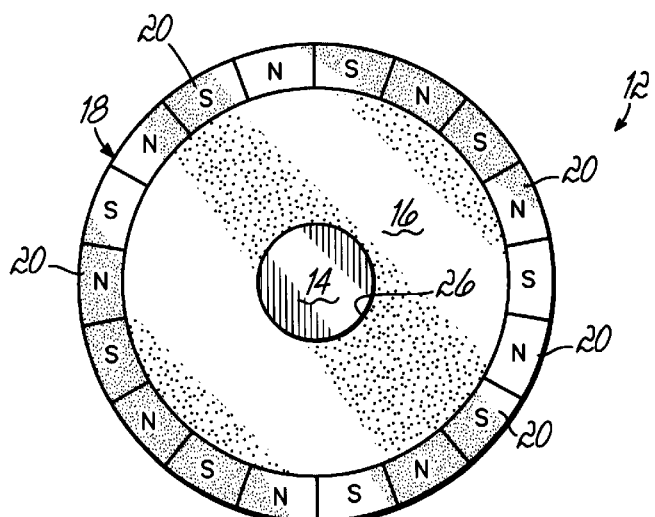

FIG. 5 depicts another embodiment of a disk 12 of the present invention having an inner annular magnetically conducting segment 16 and an outer annular permanent magnet segment 18 comprising a ring of hard ferromagnetic powder metal magnetized to create a plurality of alternating polarity permanent magnets 20 substantially continuously around the entire disk 12. It should be understood by one skilled in the art that small magnetically dead regions (not shown) may occur between magnet poles. Nonetheless, the embodiment of FIG. 5 provides a simple construction having a strong magnet layer.

Figure 6:
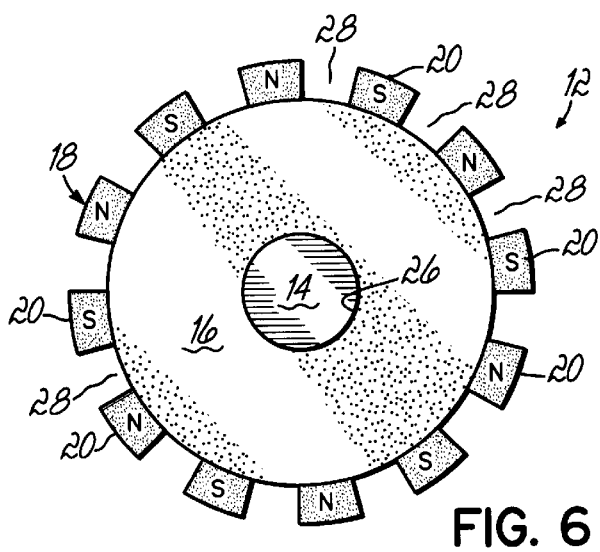

FIG. 6 depicts yet another alternative embodiment of a disk 12 of the present invention having an inner annular magnetically conducting segment 16 and an outer annular permanent magnet segment 18 comprising a plurality of discrete alternating polarity powder metal permanent magnets 20 separated by spaces or air gaps 28. This embodiment is magnetically equivalent to the embodiment of FIGS. 1 and 2, as air is non-conducting, but lacks the added structural stability provided by the powder metal non-conducting segments 22.

While FIGS. 1–6 depict various embodiments for a surface permanent magnet rotor, it should be appreciated that numerous other embodiments exist having a varying number of permanent magnets 20, and having various sizes of permanent magnets 20, as well as varying sizes for the air gaps 28 separating the permanent magnets 20, as in FIG. 6, or the size of the non-conducting segments 22 separating the permanent magnets 20, as in FIGS. 1–4. Thus, the invention should not be limited to the particular embodiments shown in FIGS. 1–6. It should be further understood that each embodiment described as a disk 12 could be formed as a ring, which is generally understood to have a smaller annular width and larger inner diameter than a disk. Thus, the term disk used throughout the description of the invention and in the claims hereafter is hereby defined to include a ring. Further, the term disk includes solid disks. The aperture in the center of the disk that receives the rotor shaft may be later formed, for example, by machining.

The present invention further provides a method for fabricating composite powder metal disks or rings for assembling into a rotor for a surface permanent magnet machine. To this end, and in accordance with the present invention, a disk-shaped die is provided having discrete regions in a pattern corresponding to the desired rotor magnetic configuration. An inner annular region is filled with a soft ferromagnetic powder metal to ultimately form the inner annular magnetically conducting segment of the rotor. In an embodiment in which the permanent magnets are to be separated by non-conducting powder metal segments, a plurality of discrete regions are filled with non-ferromagnetic powder metal to ultimately form the magnetically non-conducting segments of the rotor. Inserts may be used to form spaces in which prefabricated permanent magnets may later be affixed. In an embodiment in which the permanent magnets comprise hard ferromagnetic powder metal, an outer annular region or a plurality of discrete regions are filled with the hard ferromagnetic powder metal. Inserts may be used to maintain spaces between the magnets for air gaps. The powder metals are pressed in the die to form a compacted powder metal disk. This compacted powder metal is then sintered to form a powder metal disk or lamination having an inner annual region of magnetically conducting material and an outer annular region of permanent magnets and optional non-conducting powder metal or air gaps, the disk exhibiting high structural stability. The pressing and sintering process results in a magnetically conducting segment having a density of at least 95% of theoretical density, permanent magnets having a density of at least about 95.5%±3.5% of theoretical density (depending on fill factor) and optional non-conducting segments having a density of at least 85% of theoretical density. The method for forming these rotors provides increased mechanical integrity, reduced flux leakage, more efficient flux channeling, reduced cost and simpler construction.

For alternative embodiments of a disk of the present invention, such as shown in FIGS. 3 and 4, a non-ferromagnetic powder metal is filled into the die in a desired pattern in the inner annular region to ultimately form the non-conducting inserts, as described above.

The method of the present invention may thus include filling a die with two or three dissimilar powder metals. At the least, the die is partially filled in an inner annular portion with a soft ferromagnetic powder metal. For certain embodiments of the present invention, the die may also be filled with a non-ferromagnetic powder metal in regions of one or both the inner annular portion and an outer annular portion of the die. For other embodiments of the present invention, the die may be filled with a hard ferromagnetic powder metal in all or portions of the outer annular portion of the die.

In one embodiment of the present invention, using two or three dissimilar powder metals, the regions in the die are filled concurrently with the various powder metals, which are then concurrently pressed and sintered. In another embodiment of the present invention also using two or three dissimilar powder metals, the regions are filled sequentially with the powder metal being pressed and then sintered after each filling step. In other words, one powder metal is filled, pressed and sintered, and then the second powder metal is filled and the entire assembly is pressed and sintered, and then the optional third powder metal is filled and the entire assembly is pressed and sintered.

The pressing of the filled powder metal may be accomplished by uni-axially pressing the powder in a die, for example at a pressure of about 45–50 tsi. It should be understood that the pressure needed is dependent upon the particular powder metal materials that are chosen. In a further embodiment of the present invention, the pressing of the powder metal involves heating the die to a temperature in the range of about 275° F. (135° C.) to about 290° F. (143° C.), and heating the powders within the die to a temperature about 175° F. (79° C.) to about 225° F. (107° C.).

In an embodiment of the present invention, the sintering of the pressed powder comprises heating the compacted powder metal to a first temperature of about 1400° F. (760° C.) and holding at that temperature for about one hour. Generally, the powder metal includes a lubricating material, such as a plastic, on the particles to increase the strength of the material during compaction. The internal lubricant reduces particle-to-particle friction, thus allowing the compacted powder to achieve a higher green strength after sintering. The lubricant is then burned out of the composite during this initial sintering operation, also known as a de-lubrication or delubing step. A delubing for one hour is a general standard practice in the industry and it should be appreciated that times above or below one hour are sufficient for the purposes of the present invention if delubrication is achieved thereby. Likewise, the temperature may be varied from the general industry standard if the ultimate delubing function is performed thereby. After delubing, the sintering temperature is raised to a full sintering temperature, which is generally in the industry about 2050° F. (1121° C.). During this full sintering, the compacted powder shrinks, and particle-to-particle bonds are formed, generally between iron particles. Standard industry practice involves full sintering for a period of one hour, but it should be understood that the sintering time and temperature may be adjusted as necessary. The sintering operation may be performed in a vacuum furnace, and the furnace may be filled with a controlled atmosphere, such as argon, nitrogen, hydrogen or combinations thereof. Alternatively, the sintering process may be performed in a continuous belt furnace, which is also generally provided with a controlled atmosphere, for example a hydrogen/nitrogen atmosphere such as 75% $H_2$/25% $N_2$. Other types of furnaces and furnace atmospheres may be used within the scope of the present invention as determined by one skilled in the art.

For the purposes of illustrating the method of the present invention, FIGS. 7–11C depict die inserts, hopper configurations and pressing techniques that may be used to achieve the concurrent filling or sequential filling of the powder metals and subsequent compaction to form the composite powder metal disks of the present invention. It is to be understood, however, that these illustrations are merely examples of possible methods for carrying out the present invention.

Figure 7:
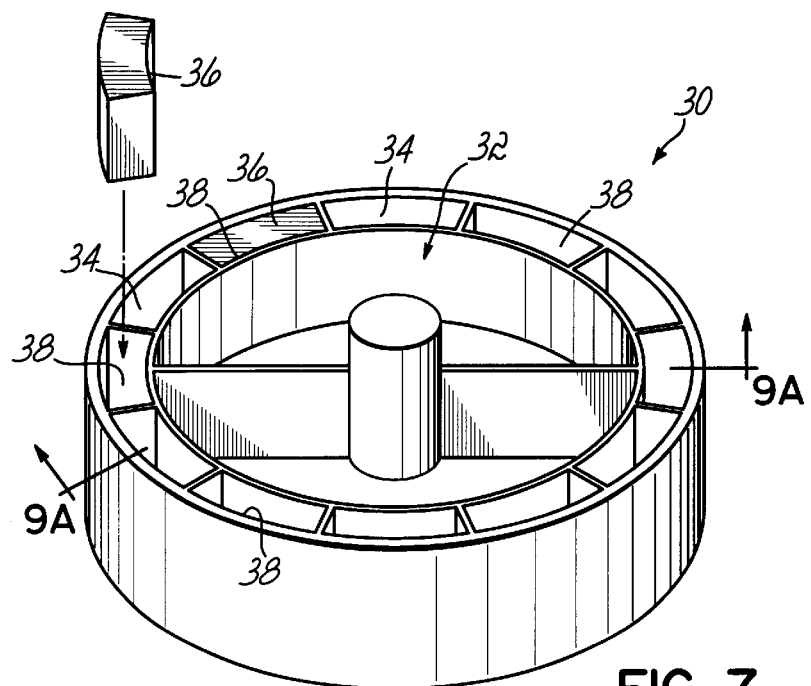
FIG. 7 is a perspective view of an insert for use in a method of the present invention.
Figure 8:
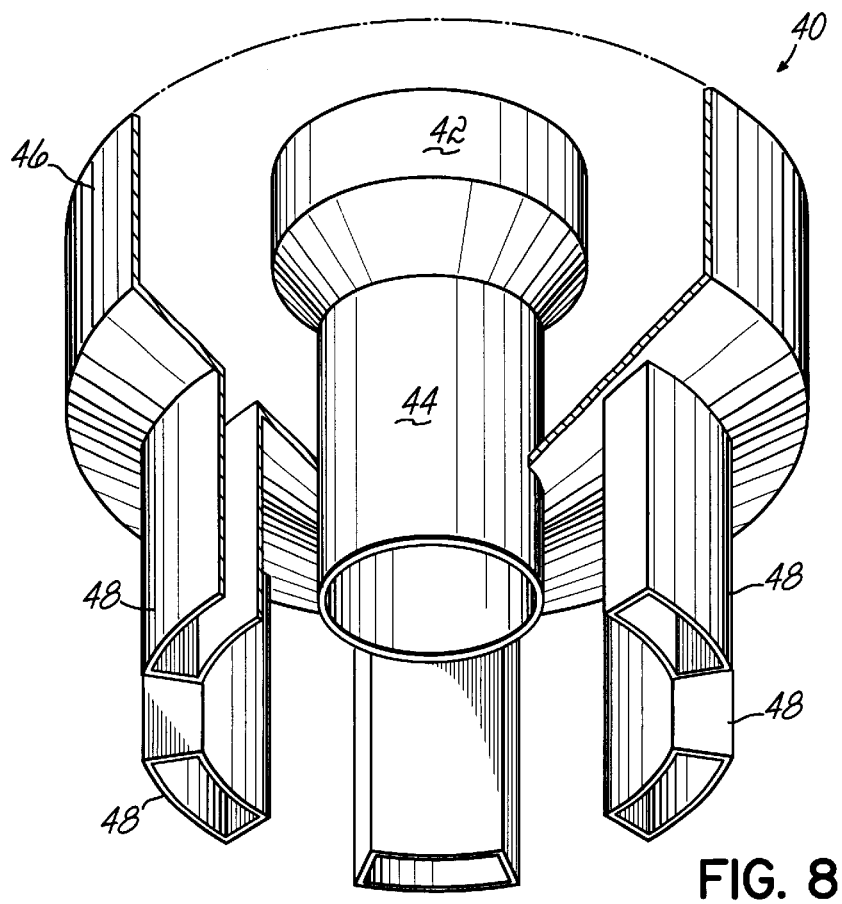
FIG. 8 is a perspective view of an inner bowl and outer bowl of a hopper that may be used for the filling aspect of the present invention.

FIG. 7 depicts a die insert 30 that may be placed within a die cavity to produce the powder metal disk 12 of FIGS. 1 and 2 in which the permanent magnets are prefabricated and affixed in the composite disk after compaction and sintering of the powder metals. The two powder metals, i.e. the soft ferromagnetic and non-ferromagnetic powder metals, are filled concurrently or sequentially into the separate insert cavities 32,34, and then the insert 30 is removed. Spacing inserts 36 may be placed in cavities 38 to form spaces between the non-conducting segments 22 into which the permanent magnets 20 may subsequently be inserted and affixed. By way of example only, FIG. 8 depicts a hopper assembly 40 that may be used to fill the insert 30 of FIG. 7 with the powder metals. In this assembly 40, an inner bowl 42 is provided having an annular tube 44 for forming the inner annular conducting segment 16 of the composite part or metal disk 12 of FIGS. 1 and 2. This inner bowl 42 is adapted to hold and deliver the soft ferromagnetic powder metal. An outer bowl 46 is positioned around the inner bowl 42, with a plurality of tubes 48 for forming the spaced non-conducting segments 22 in the outer annular permanent magnet segment 18. This outer bowl 46 is adapted to hold and deliver non-ferromagnetic powder metal. This dual hopper assembly 40 enables either concurrent or sequential filling of the die insert of FIG. 7.

Figure 9A:
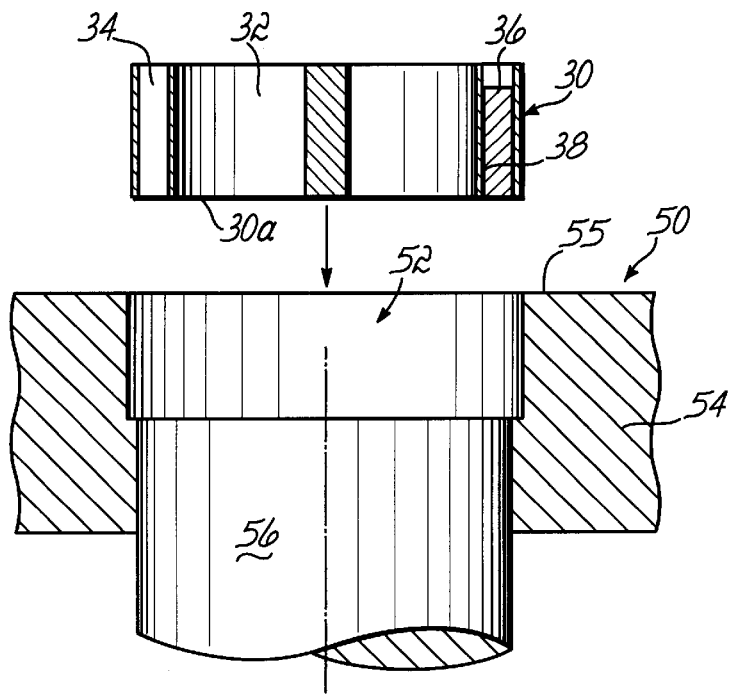
FIGS. 9A–9E are cross-sectional schematic views of a method of the present invention using the insert of FIG. 7 and the hopper of FIG. 8 to produce the rotor assembly of FIGS. 1 and 2.
Figure 9B:
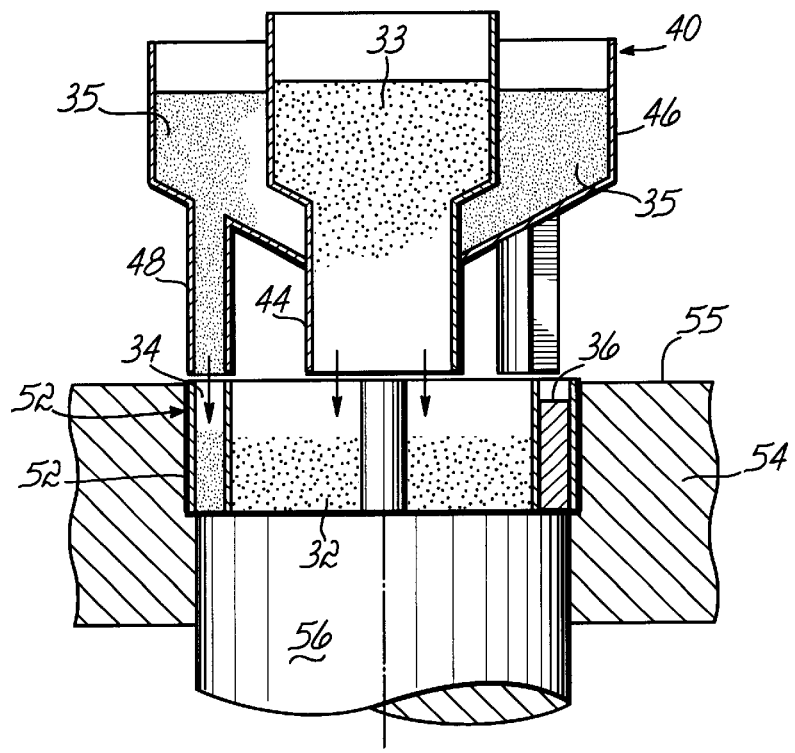
Figure 9C:
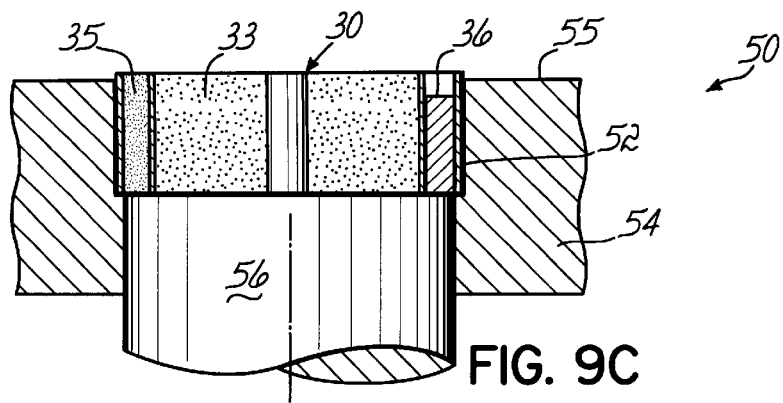
Figure 9D:
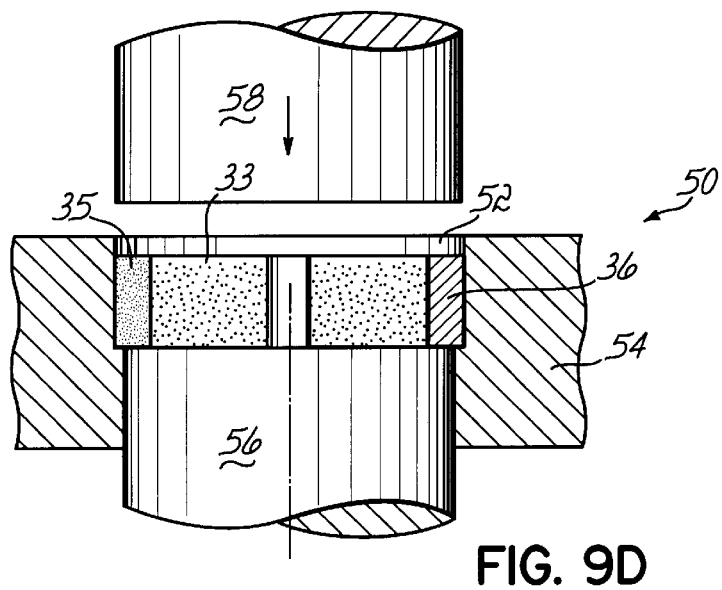
Figure 9E:
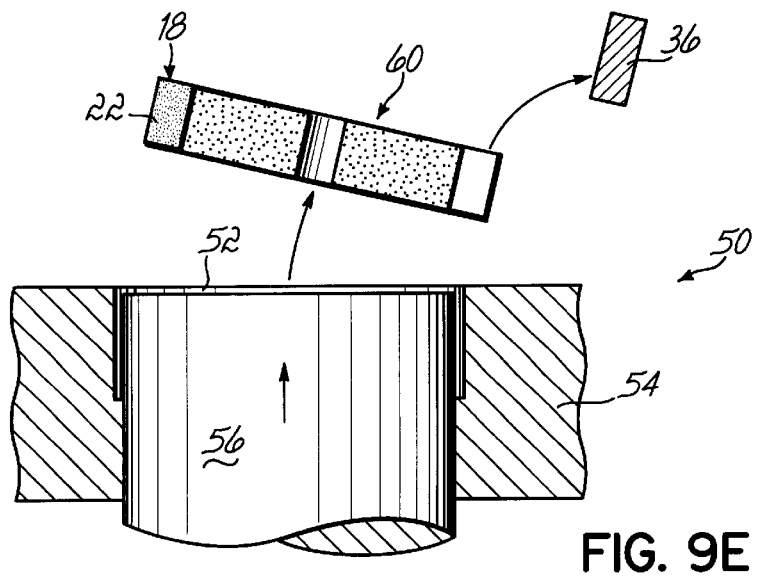

FIGS. 9A–9E depict schematic views in partial cross-section taken along line 9A—9A of FIG. 7 of how the die insert 30 of FIG. 7 and the hopper assembly 40 of FIG. 8 can be used with an uniaxial die press 50 to produce the composite powder metal disk 12 of FIGS. 1 and 2. In this method, the die insert 30 is placed within a cavity 52 in the die 54, as shown in FIG. 9A, with a lower punch 56 of the press 50 abutting the bottom 30a of the insert 30. The hopper assembly 40 is placed over the insert 30 and the powder metals 33,35 are filled into the insert cavities 32,34, concurrently or sequentially, as shown in FIG. 9B. The hopper assembly 40 is then removed, leaving a filled insert 30 in the die cavity 52, as shown in FIG. 9C. Then the insert 30 is lifted out of the die cavity 52, which causes some settling of the powder, as seen in FIG. 9D. The upper punch 58 of the press 50 is then lowered down upon the powder-filled die cavity 52, as shown by the arrow in FIG. 9D, to uniaxially press the powders in the die cavity 52. The final composite part 60 is then ejected from the die cavity 52 by raising the lower punch 56 and the spacing inserts 36 are removed. The part 60 is next transferred to a sintering furnace (not shown). Where the filling is sequential, the first powder is poured into either the inner bowl 42 or outer bowl 46, and a specially configured upper punch 58 is lowered so as to press the filled powder, and the partially filled and compacted insert (not shown) is sintered. The second fill is then effected and the insert 30 removed for pressing, ejection and sintering of the complete part 60.

Figure 10:
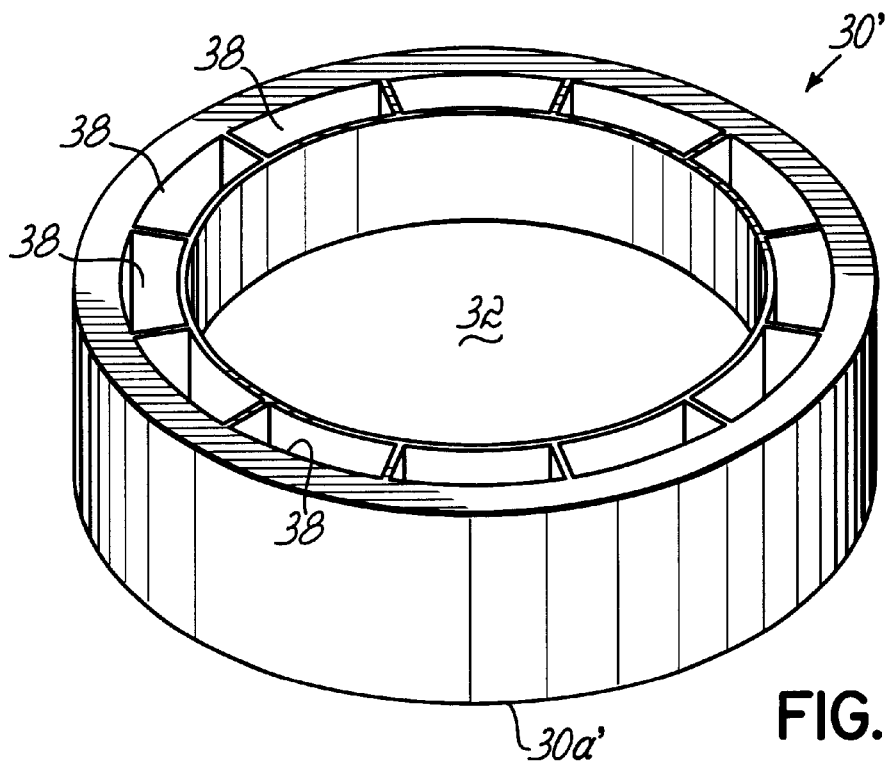
FIG. 10 is a perspective view of an insert for use in an alternative method of the present invention.
Figure 11A:
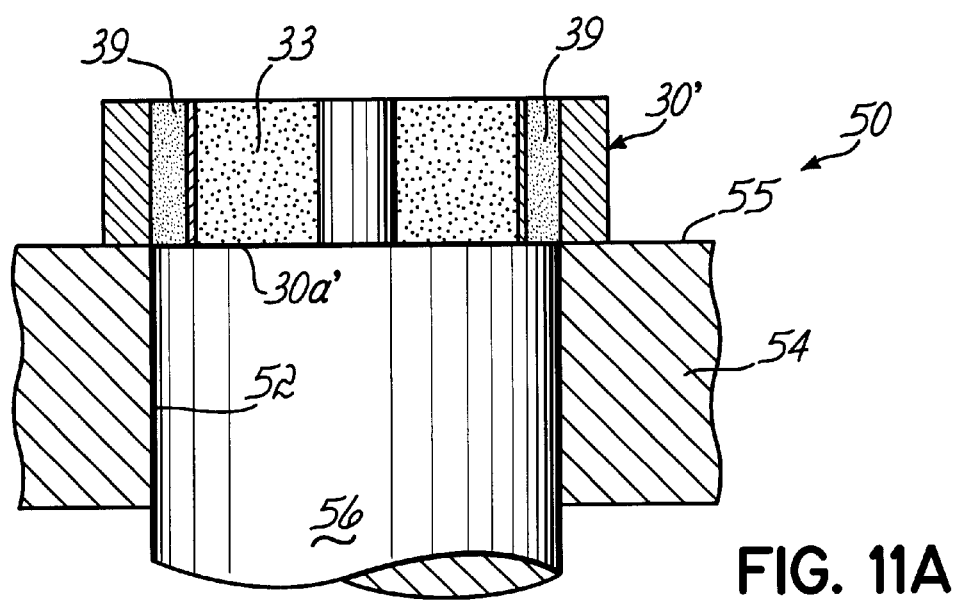
FIGS. 11A–11C are cross-sectional schematic views of the present invention using the insert of FIG. 10 and the hopper of FIG. 8 to produce the rotor assembly of FIGS. 1 and 2.
Figure 11B:
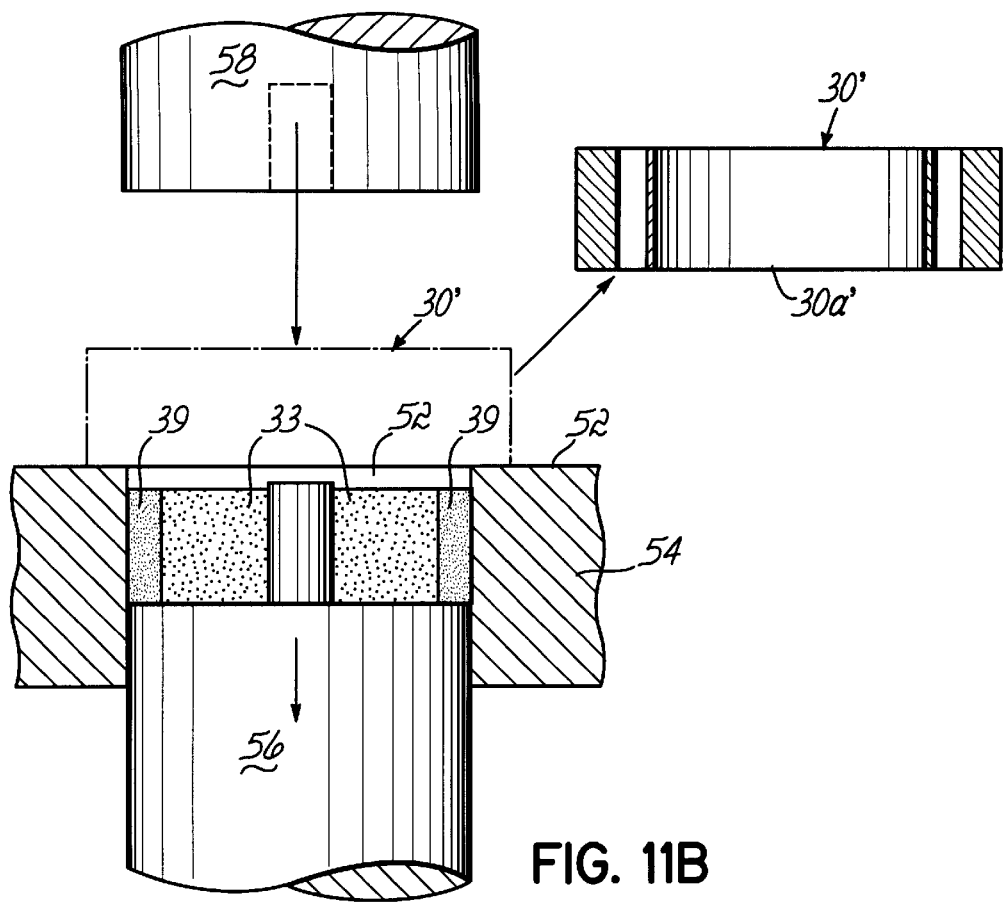
Figure 11C:
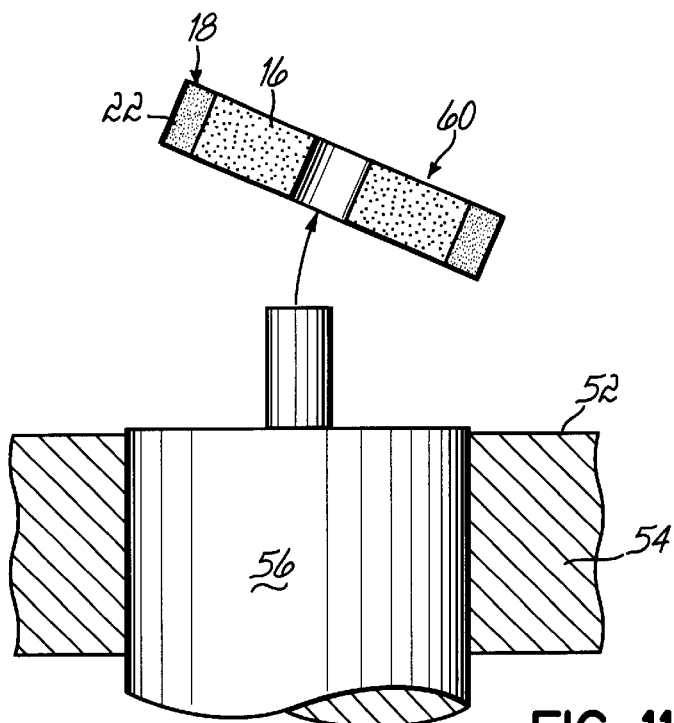

FIG. 10 depicts an alternative die insert 30' that may be placed on a top surface 55 of the die 54 over the die cavity 52 to form the powder metal disk 12 depicted in FIG. 5. The die insert 30' has an inner annular cavity for forming the inner annular conducting segment 16 and a single cavity (not shown) or plurality of outer annular cavities 38 for forming the outer annular permanent magnet segment 18. The hopper assembly 40 of FIG. 8 would differ in that the outer bowl 46 could form a single ring around the inner bowl 42 rather than having discrete tubes 48. The outer bowl would hold and deliver the hard ferromagnetic powder metal. FIGS. 11A–11C show the method for using the insert 30' of FIG. 10. The insert is set on top surface 55 of the die 54 over the cavity 52 with the lower punch 56 in the ejection position, as shown in FIG. 11A. The powder metals 33,39 are then filled into the insert 30', either concurrently or sequentially, similarly to the filling operation shown in FIG. 9B, and the lower punch 56 is then lowered to the fill position. The lowering of the punch 56 forms a vacuum which pulls the powder metals 33,39 out of the bottom 30a' of the insert 30' and into the die cavity 52, as shown in FIG. 11B. The insert 30' is then removed from the top surface 55 of the die 54, and the upper punch 58 is lowered into the die cavity 52 to compact the powder metals 33,39. The lower punch 56 is then raised to eject the final composite part 60, as shown in FIG. 11C, and the part 60 is then transferred to a sintering furnace (not shown). The outer annular permanent magnet segment 18 is subsequently magnetized to create the regions of alternating polarity, i.e. the permanent magnets 20.

In one embodiment of the present invention, pneumatic air hammers or tappers (not shown) may be placed on, in, or around the inserts 30,30' used in either the method depicted in FIGS. 9A–9E or the method depicted in FIGS. 11A–11C. The vibrating of the insert 30,30' enables the powder metal 33,35,39 to flow out of the insert 30,30' with greater ease as the insert 30,30' is removed, and further enables a greater tap density. In another embodiment of the present invention, a dry lube is sprayed or added to the inside of the insert cavities 32,34,38 used in either of those methods. Again, this dry lube helps to improve the flow of the powder metals 33,35,39 out of the insert 30,30'. In yet another embodiment of the present invention, heaters and thermocouples (not shown) may be used in conjunction with the insert 30,30'. The heat keeps the powder warm, if warm compaction is being optimized, and again allows the powder metals 33,35, 39 to more easily flow out of the insert 30,30'.

It should be further understood that while the methods shown and described herein are discussed with respect to forming a composite disk with an aperture in the center for receiving the shaft of a rotor assembly, the composite part may be formed as a solid disk, with the aperture being machined after compaction or sintering. Likewise, the outer annular segment 18 may be first formed as a solid ring of pressed and sintered non-ferromagnetic powder metal, then machined to form spaces into which permanent magnets may be inserted.

For an embodiment of the present invention in which the permanent magnets are pressed and sintered hard ferromagnetic powder metal separated by non-conducting segments, a three-hopper assembly may be used to achieve a tri-fill process. As with the dual-fill processes described above, the tri-fill process can include concurrent filling of the powder metals or sequential filling of the powder metals.

While the present invention has been illustrated by the description of embodiments thereof, and while the embodiments have been described in considerable detail, they are not intended to restrict or in any way limit the scope of the appended claims to such detail. Additional advantages and modifications will readily appear to those skilled in the art. For example, variations in the hopper assembly, filling method and die inserts may be employed to achieve a composite powder metal disk of the present invention, and variations in the magnetic configuration of the disks other than that shown in the Figures herein are well within the scope of the present invention. The invention in its broader aspects is therefore not limited to the specific details, representative apparatuses and methods and illustrative examples shown and described. Accordingly, departures may be made from such details without departing from the scope or spirit of applicant's general inventive concept.

What is claimed is:

1. A method of making a powder metal rotor for a surface permanent magnet machine, the method comprising:
   filling an inner annular region of a disk-shaped die with a soft ferromagnetic powder metal;
   filling discrete regions within an outer annular region of the die with a non-ferromagnetic powder metal so as to leave spaces between each discrete region;
   pressing the soft ferromagnetic and non-ferromagnetic powder metals in the die to form a compacted powder metal disk;
   sintering the compacted powder metal disk; and
   providing permanent magnets in the spaces between the discrete regions of the outer annular region in an arrangement of alternating polarity to form a composite powder metal disk having an inner annular magnetically conducting segment and an outer annular segment of a plurality of alternating polarity permanent magnets separated by magnetically non-conducting segments.

2. The method of claim 1, wherein the inner annular region and discrete regions are filled concurrently.

3. The method of claim 1, wherein the inner annular region and discrete regions are filled sequentially with the powder metal being pressed and sintered alter each filling step.

4. The method of claim 1, wherein the providing of permanent magnets includes affixing prefabricated permanent magnets to the inner annular segment and to adjacent magnetically non-conducting segments.

5. The method of claim 1, wherein the providing of permanent magnets includes filling the spaces between each discrete region with a hard ferromagnetic powder metal, pressing the hard ferromagnetic powder metal and sintering the pressed powder.

6. The method of claim 5, wherein the inner annular region, discrete regions and spaces are filled concurrently.

7. The method of claim 5, wherein the inner annular region, discrete regions and spaces are filled sequentially with the powder metal being pressed and sintered after each filling step.

8. The method of claim 1, wherein the soft ferromagnetic powder metal is Ni, Fe, Co or an alloy thereof.

9. The method of claim 1, wherein the soft ferromagnetic powder metal is a high purity iron powder wit a minor addition of phosphorus.

10. The method of claim 1, wherein the non-ferromagnetic powder metal is an austenitic stainless steel.

11. The method of claim 1, wherein the non-ferromagnetic powder metal is an AISI 8000 series steel.

12. The method of claim 1, wherein the pressing comprises uniaxially pressing the powder metals in the die.

13. The method of claim 1, wherein the pressing comprises pre-heating the powder metals and pre-heating the die.

14. The method of claim 1, wherein, after the pressing, the compacted powder metal disk is de-lubricated at a first temperature, followed by sintering at a second temperature greater than the first temperature.

15. The method of claim 1, wherein the sintering is performed in a vacuum furnace having a controlled atmosphere.

16. The method of claim 1, wherein the sintering is performed in a belt furnace having a controlled atmosphere.

17. The method of claim 1, further comprising filling a portion of the inner annular region in a desired pattern with a non-ferromagactic powder metal, pressing the non-ferromagnetic powder metal, and sintering the pressed powder to form a inner magnetically non-conducting segment.

18. The method of claim 1 further comprising stacking a plurality of the composite powder metal disks axially along a shaft to form a powder metal rotor assembly.

19. A method of making a powder metal rotor for a surface permanent magnet machine, the method comprising:
   filling an inner annular region of a disk-shaped die with a soft ferromagnetic powder metal;
   pressing the soft ferromagnetic powder metal in the die to form a compacted magnetically conducting segment;
   sintering the compacted magnetically conducting segment;
   filling discrete regions within an outer annular region of the die with a non-ferromagnetic powder metal so as to leave spaces between each discrete region;
   pressing the non-ferromagnetic powder metal in the die to form a plurality of compacted magnetically non-conducting segments;
   sintering the compacted magnetically non-conducting segments and the compacted and sintered conducting segment to form a composite powder metal disk having an inner annular magnetically conducting segment and outer annularly spaced magnetically non-conducting segments; and
   providing permanent magnets in the spaces between the magnetically non-conducting segments.

20. The method of claim 19 further comprising affixing prefabricated permanent magnets of alternating polarity between the spaced magnetically non-conducting segments.

21. The method of claim 19 wherein the providing step comprises, after the second sintering step, filling the spaces between the magnetically non-conducting segments with a hard ferromagnetic powder metal, pressing the hard ferromagnetic powder metal in the die to form a plurality of compacted permanent magnet segments, and sintering the compacted permanent magnet segments and the compacted and sintered conducting segment and magnetically non-conducting segments to form a composite powder metal disk having an inner annular magnetically conducting segment and outer annular alternating polarity permanent magnets spaced by magnetically non-conducting segments.

22. The method of claim 19, wherein the soft ferromagnetic powder metal is Ni, Fe, Co or an alloy thereof.

23. The method of claim 19, wherein the soft ferromagnetic powder metal is a high purity iron powder with a minor addition of phosphorus.

24. The method of claim 19, wherein the non-ferromagnetic powder metal is an austenitic stainless steel.

25. The method of claim 19, wherein the non-ferromagnetic powder metal is an AISI 8000 series steel.

26. The method of claim 19, wherein each pressing comprises uniaxially pressing the powder in the die.

27. The method of claim 19, wherein each pressing comprises pre-heating the powder and pre-heating the die.

28. The method of claim 19, wherein, after each pressing, the compacted segments are de-lubricated at a first temperature, followed by sintering at a second temperature greater than the first temperature.

29. The method of claim 19, wherein each sintering is performed in a vacuum furnace having a controlled atmosphere.

30. The method of claim 19, wherein each sintering is performed in a belt furnace having a controlled atmosphere.

31. The method of claim 19 farther comprising stacking a plurality of the composite powder metal disks axially along a shaft to form a powder metal rotor assembly.

32. A method of making a powder metal rotor for a surface permanent magnet machine, the method comprising:

filling a disk-shaped die in an inner annular region with a soft ferromagnetic powder metal and an outer annular region with a hard ferromagnetic powder metal;

pressing the soft and hard ferromagnetic powder metals in the die to form a compacted powder metal disk; and sintering the compacted powder metal disk and magnetizing the hard ferromagnetic powder metal to form a composite powder metal disk having an inner annular magnetically conducting segment and an outer annular segment of alternating polarity permanent magnets.

33. The method of claim 32 wherein the outer annular segment comprises a continuous ring of hard ferromagnetic powder metal.

34. The method of claim 32, wherein the outer annular region is filled with the hard ferromagnetic powder metal in discrete regions so as to leave gaps therebetween.

35. The method of claim 34, wherein the gaps are filled with a non-ferromagnetic powder metal which is then pressed and sintered to form magnetically non-conducting segments between the permanent magnets.

36. The method of claim 32, wherein the soft ferromagnetic powder metal is Ni, Fc, Co or an alloy thereof.

37. The method of claim 32, wherein the soft ferromagnetic powder metal is a high purity iron powder with a minor addition of phosphorus.

38. The method of claim 32, wherein the inner annular and outer annular regions are filled concurrently.

39. The method of claim 32, wherein the inner annular and outer annular regions are filled sequentially with the powder metal being pressed and sintered after each filling step.

40. The method of claim 32, wherein the pressing comprises uniaxially pressing the powder metals in the die.

41. The method of claim 32, wherein the pressing comprises pre-heating the powder metals and pre-heating the die.

42. The method of claim 32, wherein, after the pressing, the compacted powder metal disk is de-lubricated at a first temperature, followed by sintering at a second temperature greater than the first temperature.

43. The method of claim 32, wherein the sintering is performed in a vacuum furnace having a controlled atmosphere.

44. The method of claim 32, wherein the sintering is performed in a belt furnace having a controlled atmosphere.

45. The method of claim 32 further comprising stacking a plurality of the composite powder metal disks axially along a shaft to form a powder metal rotor assembly.

* * * * *